United States Patent Office 3,575,808
Patented Apr. 20, 1971

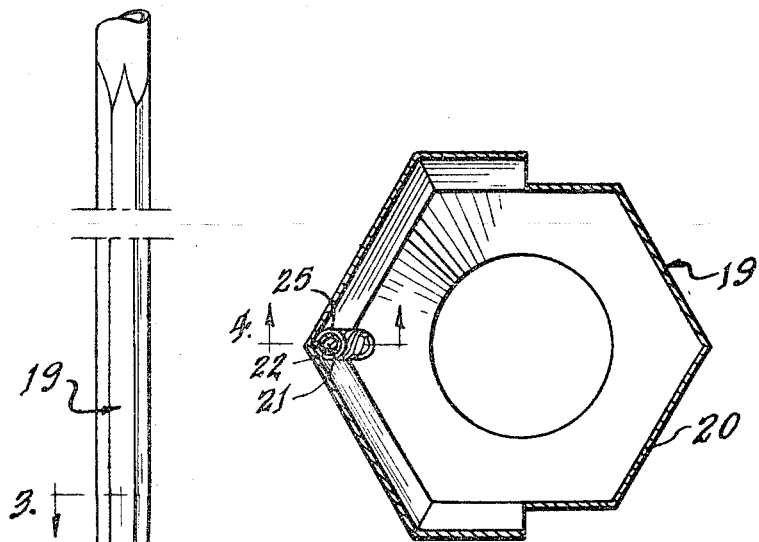
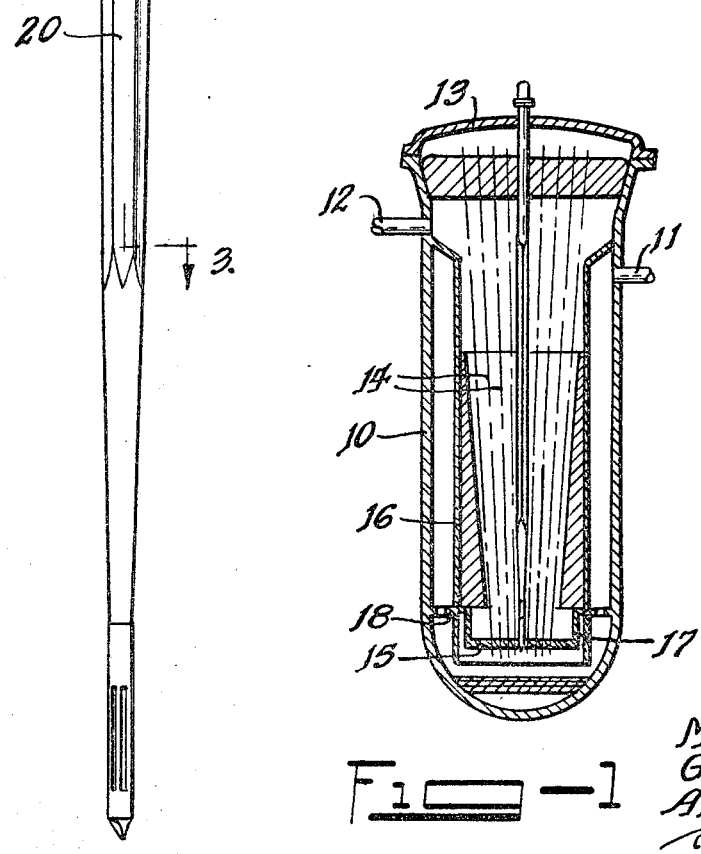
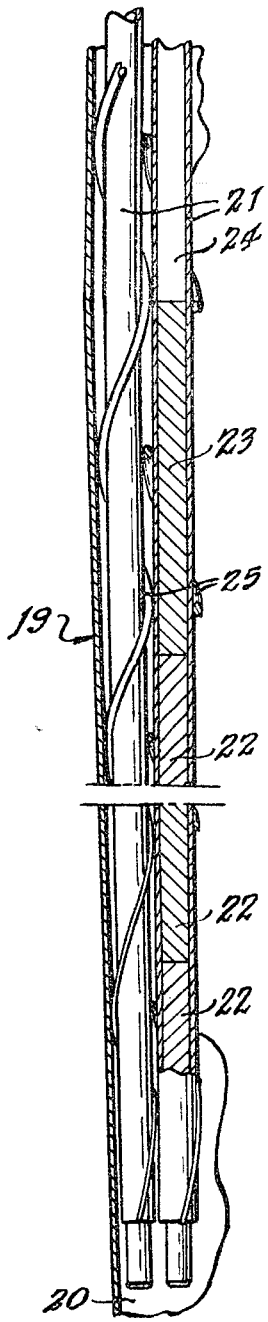

---

3,575,808
FUEL SUBASSEMBLY FOR A LIQUID-METAL-COOLED, FAST BREEDER REACTOR
Marlyn T. Jakub, Richland, Galen M. Hesson, Kennewick, and Andy J. Anthony, Pasco, Wash., assignors to the United States of America as represented by the United States Atomic Energy Commission
Filed Mar. 21, 1969, Ser. No. 809,324
Int. Cl. G21c 3/03
U.S. Cl. 176—78                 6 Claims

ABSTRACT OF THE DISCLOSURE

A fast reactor includes a plurality of fuel subassemblies arranged so that the upper ends are further apart than are the lower ends. Each fuel subassembly includes a bundle of slender, elongated cylindrical fuel pins which are inclined in conical array over that part of the pins which contains the fuel and which are parallel over that part of the pins which contains a fission-gas plenum. The fuel pins are spaced from each other and from the walls of the shroud surrounding the bundle of fuel pins by spacer wires which are of gradually increasing cross section from the bottom to the top of that part of the fuel pin containing the fuel and are of uniform cross section over that portion of the fuel pin containing the fission-gas plenums.

CONTRACTUAL ORIGIN OF THE INVENTION

The invention described herein was made in the course of, or under, a contract with the United States Atomic Energy Commission.

CROSS REFERENCES TO RELATED APPLICATIONS

This application is related to application Ser. No. 720,198, filed Apr. 10, 1968, now U.S. Patent No. 3,505,170, and application Ser. No. 721,738, filed Apr. 16, 1968, now U.S. Patent No. 3,468,757, both of which are assigned to the assignee of the present application and describe and claim alternative approaches to solution of the problems confronting the inventors in the present application.

BACKGROUND OF THE INVENTION

This invention relates to a liquid-metal-cooled fast reactor having improved performance characteristics. In more detail, the invention relates to a fuel subassembly for such a reactor in which increased fuel density and better mixing of coolant in the hottest region of the fuel subassembly are combined with decreased resistance to flow of liquid-metal coolant.

Fuel subassemblies for liquid-metal-cooled fast reactors conventionally consist of a compact bundle of elongated small-diameter fuel pins enclosed within a shroud. For a large fast reactor such as the Fast Flux Test Facility—described in reports No. BNWL-501 and BNWL-SA-978, available from the Clearinghouse for Federal Scientific and Technical Information, U.S. Department of Commerce, Springfield, Va., and in patent application Ser. No. 718,685, filed Apr. 4, 1968—the fuel pins must be very long to accommodate nuclear fuel, neutron reflector or blanket material and a plenum to accommodate fission gases evolved in the fuel. This plenum serves as an accumulation reservoir for fission gases evoled in the fuel.

In general, the amount of fission gas which may be contained in the gas plenum is a function of the gas temperature, the plenum volume, and the strength of the clad "vessel." Since the amount of fission gas released is a function of the fissile fuel burnup, it is desirable to allow large fission gas accumulations in order to obtain equivalent high burnup. Plenum length is the only design variable immediately at hand for increasing fission gas accumulation, since temperature is established by reactor operating conditions and clad strength is determined by available material properties. The obvious consequence of increased plenum and pin length is an increase in coolant pressure drop occasioned by the extra frictional surface resistance of the fuel bundle. Preliminary studies indicate that plenum chamber lengths will range from two feet to ten feet over temperature ranges of 800° F. to 1200° F., respectively. These lengths result from very modest burnup allowances (less than 50,000 mwd./t.) and are expected to increase for greater fuel burnup. The typical coolant pressure drop through a high performance fast breeder fuel bundle is about 20 p.s.i. per foot of pin length. Fast breeder fuel pins typically have an active fuel length of three to four feet. It is apparent that a fuel assembly with closed fission-gas-accumulation chambers which require the coolant to maintain constant velocities through the reactor core equal to velocities in the fuel zone will exhibit coolant pressure drops of up to 200 p.s.i. Not only do these conditions dictate the use of piping capable of withstanding the resulting high stresses, but requirements for pumps may transcend the limits of present technology.

Most of the production designs for fast breeder fuels show a preferred fuel bundle arrangement wherein fuel is arranged in a regular lattice of vertical, prismatic subassemblies with parallel axes. Since the cross sectional area of such a reactor core is constant throughout its height, there is no possibility for varying the packing density of the fuel to reduce the coolant pressure drop. However, there is a class of dispersed fast reactor cores which provide an expanding array of fuel bundles in approximately vertical orientation. One proposed design for the Fast Test Reactor is of this class and it is to reactors of this class that this invention relates.

SUMMARY OF THE INVENTION

According to the present invention, each fuel subassembly of a fast reactor comprises a shroud tightly enclosing a bundle of fuel pins which are inclined in conical array over that part of the fuel pins containing the fuel and are parallel over that part of the fuel pins containing the fission-gas plenum. The fuel pins thus are bent at the junction between the fuel portion and the plenum portion thereof. According to the preferred embodiment, this configuration is attained by employing spacing wires which are of gradually increasing cross section from the bottom to the top of that part of the fuel pin containing the fuel and spacing wires of uniform cross section throughout that part of the fuel pin containing the fission-gas plenum.

BRIEF DESCRIPTION OF THE DRAWING

The invention will next be described in connection with the accompanying drawing wherein:

FIG. 1 is a schematic vertical section of a nuclear reactor in which the present invention may be incorporated.

FIG. 2 is a vertical elevation of a fuel subassembly for use therein.

FIG. 3 is an enlarged horizontal section taken on the line 3—3 in FIG. 2.

FIG. 4 is an enlarged vertical section of a part of the fuel subassembly taken on the line 4—4 in FIG. 3.

DETAILED DESCRIPTION OF THE INVENTION

As shown sketchily in FIG. 1, a nuclear reactor incorporating the present invention comprises a pressure vessel 10, provided with an inlet 11, an outlet 12, and a cover 13, enclosing a plurality of inclined, tapering fuel tubes (not shown). The position the fuel tubes occupy in the reactor is indicated by dashed lines 14. The fuel tubes are supported and restrained by a bottom tube sheet 15 which is supported from a cylindrical inner vessel 16 by an annular member 17. Inner vessel 16 is in turn supported from pressure vessel 10 by ledge 18. Further details of the reactor are given in patent application Ser. No. 718,685, filed Apr. 4, 1968.

Each fuel tube encloses a fuel subassembly 19 shown in detail in FIGS. 2, 3 and 4. Fuel subassembly 19 comprises a hexagonal shroud 20 enclosing a bundle of slender, elongated cylindrical fuel pins 21, each of which contains a plurality of fuel pellets 22 making up the active portion of the reactor, a reflector 23 above the fuel pellets and a fission-gas plenum 24 above the reflector. Fuel pins 21 are inclined in conical array over that part of the pins which contains the fuel and the reflector and are parallel over that part of the pins which contains the fission-gas plenum. Thus the fuel pins 21 are bent at the juncture between that portion of the fuel pins containing the reflector and that portion containing the plenum. Shroud 20 tapers outwardly up to the top of the fuel portion of the fuel pins to accommodate the conical bundle of fuel pins and has parallel sides thereabove. Coolant enters shroud 20 at the bottom, flows upwardly past fuel pins 21, and leaves shroud 20 at the top.

As shown particularly in FIG. 4, each fuel pin 21 is wrapped with a spacer wire 25. Each spacer wire 25 is of gradually increasing cross section from the bottom to the top of the fuel portion of the fuel pin and of uniform cross section over the remainder of the length of the fuel pin. Spacer wires 25 positively establish the spacing of the fuel pins in the fuel bundle, ensuring that the packing density of the bundle decreases from the bottom to the top of that portion of the bundle containing the fuel.

Thus, coolant enters the fuel subassemblies at the bottom thereof and flows upwardly through the gradually expanding fuel bundle. In this part of the fuel bundle, not only does the fuel density decrease but also the coolant flow velocity decreases. In the upper portion of the fuel bundle, the coolant flow velocity remains constant since the fuel pins are parallel. It is necessary to bend the fuel pins to place them in parallel relationship above the fuel since there is not room enough to accommodate fuel subassemblies having a fission-gas plenum of the desired length which constantly expand in cross section all the way to the top of the fuel subassemblies.

According to one specific embodiment of the invention, each fuel subassembly contains 217 fuel pins which are 0.25 inch in diameter, and contain fuel pellets extending over 36 inches of the length of the fuel pin, a reflector which is 9 inches long and a fission-gas plenum which is 6 feet long. The fuel subassembly is 5 inches corner-to-corner at the bottom of the fuel portion of the fuel pins and 6 inches corner-to-corner at the top of the reflector. The spacer wire is 10 to 12 feet long and has a width of 0.080 inch at the top of the reflector and a width of 0.030 inch at the bottom of the fuel.

The following Table gives some of the operating parameters of several fuel subassemblies constructed in accordance with the present invention and comparable assemblies constructed as suggested in the prior art.

Advantages of the construction claimed herein may be summarized as follows. In all cases comparison is made with a conventional fuel subassembly.

(1) A 10% increase in fuel density is possible. This factor makes it possible to increase the coolant outlet temperature or reduce the Doppler coefficient.

(2) A lower pressure loss is obtained. This makes it possible to reduce the thickness of the shroud.

(3) Better mixing of coolant in the hottest region of the fuel subassembly is obtained and there is a somewhat lower temperature-change variation across the fuel bundle.

(4) Pitch-to-diameter ratio of spacing wire is high in the hottest portion of the fuel element.

(5) Assembly of the fuel subassembly is easier since the fuel pin bundle "nests" inside the shroud tube due to the similar taper of portions of the fuel pin bundle and the shroud.

(6) There is less chance for gross distortion of a single subassembly fuel tube in a tight core.

(7) Lower velocities in the hot regions of the fuel subassembly.

(8) Less chance of plugging coolant channels in the hot region of the fuel subassembly—the subassembly either plugs at the inlet or not at all.

(9) The design allows most room for fuel pin swelling due to fluence temperature at the upper end of the core where experiments have shown that swelling occurs.

It will be understood that the invention is not to be limited to the details given herein but that it may be modified within the scope of the appended claims.

The embodiments of the invention in which an exclusive property or privilege is claimed are defined as follows:

1. In a nuclear reactor which operates predominantly on fast neutrons comprising a plurality of fuel subassemblies arranged so that the upper ends thereof are further apart than are the lower ends, each fuel subassembly comprising a bundle of slender, cylindrical, elongated fuel pins tightly enclosed by a shroud, each fuel pin including a plurality of fuel pellets and a fission-gas plenum above the fuel pellets, the improvement wherein said fuel pins are inclined in conical array over that part of the pins containing the fuel pellets, are bent at the junction between the fuel pellets and fission-gas plenum, and are parallel over that part of the pins containing the fission-gas plenums.

2. The improvement according to claim 1 wherein said fuel pins are wrapped with spacer wire which are of gradually increasing cross section from the bottom to the top of that part of the fuel pins containing the fuel pellets and of uniform cross section over that part of the fuel pins containing the fission-gas plenums.

3. The improvement according to claim 2 including a reflector disposed in the fuel pins between the fuel pellets and the fission-gas plenums wherein that part of the fuel pins inclined in conical array includes the fuel pins.

4. A fuel subassembly for a nuclear reactor comprising a bundle of slender, cylindrical, elongated fuel pins tightly enclosed by a hexagonal shroud, each fuel pin including a plurality of fuel pellets and a fission-gas plenum above the fuel pellets, said fuel pins being inclined in conical array over that part of the fuel pins containing the fuel pellets, being bent at the junction between the fuel pellets and the

| Pitch-to-diameter at core inlet | Velocity at subassembly inlet [1] | Wire OD [2] | Velocity core inlet | Wire OD [3] | Velocity core outlet | Fuel volume percent | ΔP subassembly |
|---|---|---|---|---|---|---|---|
| Standard: | | | | | | | |
| 1.125 | 37.4 | .031 | 33.8 | .031 | 36.2 | 52.8 | 120 |
| 1.14 | [4] 35.6 | .035 | [4] 39.0 | .035 | 33.75 | 50.2 | [4] 94 |
| 1.16 | 37.4 | .040 | 29.3 | .040 | 31.4 | 48.4 | 83 |
| Tapered: | | | | | | | |
| 1.10 | [4] 39.4 | .025 | [4] 39.5 | .058 | 22 | 55.5 | [4] 61 |
| 1.08 | 37.4 | .021 | 42 | .054 | 22 | 57.7 | 60 |
| 1.06 | [4] 42.5 | .015 | [4] 54.5 | .050 | [4] 26 | 60.0 | [4] 87.7 |

[1] Hole size in all subassemblies is 2.35 inch I.D. Flow per subassembly is 49.2 lbs./second.
[2] Pin size set at 0.25 inch.
[3] Dimensions 3 feet above core inlet—generally within a few inches of the top of the core.
[4] Data corrected so that obtain same coolant flow per unit fuel.

fission-gas plenum, and being parallel over that part of the pins containing the fission-gas plenums.

5. A fuel subassembly according to claim 4 and including spacer wires wrapped around said fuel pins, said spacer wires being of gradually increasing cross section from the bottom to the top of that part of the fuel pins containing the fuel pellets and of uniform cross section over that part of the fuel pins containing the fission-gas plenums.

6. A fuel subassembly according to claim 5 and including a reflector disposed in the fuel pins between the fuel pellets and the fission-gas plenums wherein that part of the fuel pins inclined in conical array includes the fuel pins.

References Cited

UNITED STATES PATENTS

| | | | |
|---|---|---|---|
| 2,975,117 | 3/1961 | Zinn | 176—40X |
| 3,201,318 | 8/1965 | Dickinson | 176—30 |
| 3,212,982 | 10/1965 | Astley et al. | 176—40 |
| 3,235,463 | 2/1966 | Sunkovich | 176—17 |
| 3,368,946 | 2/1968 | Jenssen | 176—78 |
| 3,398,050 | 8/1968 | Yevick et al. | 176—30X |
| 3,468,757 | 9/1969 | Finch et al. | 176—78 |
| 3,477,909 | 11/1969 | Saunders | 176—78 |
| 3,505,170 | 4/1970 | Flowers et al. | 176—78 |

FOREIGN PATENTS

| | | | |
|---|---|---|---|
| 877,679 | 7/1961 | Great Britain | 176—31 |
| 637,005 | 2/1962 | Canada | 176—54 |

LELAND A. SEBASTIAN, Primary Examiner

G. G. SOLYST, Assistant Examiner

U.S. Cl. X.R.

176—40, 81